(12) United States Patent
Yadav

(10) Patent No.: US 12,158,881 B2
(45) Date of Patent: Dec. 3, 2024

(54) SYSTEMS AND METHODS FOR AUTOMATED DYNAMIC DATABASE SEARCH QUERIES

(71) Applicant: Evernorth Strategic Development, Inc., St. Louis, MO (US)

(72) Inventor: Navin Yadav, Coppell, TX (US)

(73) Assignee: Evernorth Strategic Development, Inc., St. Louis, MO (US)

( * ) Notice: Subject to any disclaimer, the term of this patent is extended or adjusted under 35 U.S.C. 154(b) by 9 days.

(21) Appl. No.: 18/080,249

(22) Filed: Dec. 13, 2022

(65) Prior Publication Data

US 2024/0193155 A1 Jun. 13, 2024

(51) Int. Cl.
*G06F 16/242* (2019.01)
*G06F 16/28* (2019.01)
*G06F 16/955* (2019.01)

(52) U.S. Cl.
CPC .......... *G06F 16/242* (2019.01); *G06F 16/285* (2019.01); *G06F 16/955* (2019.01)

(58) Field of Classification Search
CPC ..... G06F 16/242; G06F 16/285; G06F 16/955
See application file for complete search history.

(56) References Cited

U.S. PATENT DOCUMENTS

| | | | |
|---|---|---|---|
| 9,280,561 B2 | 3/2016 | Li et al. | |
| 9,928,111 B2 | 3/2018 | Dipol | |
| 10,015,242 B2 | 7/2018 | Konkus | |
| 10,423,649 B2 | 9/2019 | Ko | |
| 10,607,150 B2 | 3/2020 | Sainani | |
| 10,678,429 B1* | 6/2020 | Tse | G06F 3/04886 |
| 10,713,308 B2 | 7/2020 | Khalkechev | |
| 10,735,552 B2 | 8/2020 | Vaish | |
| 10,740,052 B2 | 8/2020 | Porwal | |
| 10,839,010 B2* | 11/2020 | Srivastava | G06F 16/24578 |
| 10,942,708 B2 | 3/2021 | Dolby | |
| 11,588,844 B1* | 2/2023 | Lee | G06F 16/86 |
| 11,893,403 B1* | 2/2024 | Gu | G06F 9/45558 |
| 2015/0095895 A1* | 4/2015 | Taneja | G06F 11/3684 717/132 |
| 2016/0080493 A1* | 3/2016 | Roth | H04L 67/01 709/203 |
| 2016/0140130 A1 | 5/2016 | Smirnov | |

(Continued)

*Primary Examiner* — Huawen A Peng
(74) *Attorney, Agent, or Firm* — Harness IP

(57) ABSTRACT

A method for automated entity field correction includes receiving multiple search request parameters at multiple text entry fields of a user interface of an application, the multiple search request parameters corresponding to at least one of a first and second search query types, generating uniform resource locator (URL) request parameters according to the received multiple search request parameters, and dynamically building a search query by comparing the URL request parameters to multiple search query templates in a configuration file, the multiple search query templates including at least a first search query corresponding to the first search query type and a second search query corresponding to the second search query type. The method includes transmitting the dynamically built search query to a search cluster of a database, obtaining a search query result from the search cluster, and displaying the obtained search query result on the user interface of the application.

20 Claims, 9 Drawing Sheets

(56) References Cited

U.S. PATENT DOCUMENTS

| | | | |
|---|---|---|---|
| 2016/0203548 A1* | 7/2016 | Simmons | G06Q 30/08 |
| | | | 705/26.3 |
| 2017/0004183 A1* | 1/2017 | Srivastava | G06F 16/248 |
| 2018/0268068 A1* | 9/2018 | Kang | G06F 16/634 |
| 2023/0177363 A1* | 6/2023 | Li | G06F 40/279 |
| | | | 706/45 |
| 2023/0185625 A1* | 6/2023 | Chahal | G06F 9/544 |
| | | | 718/105 |

* cited by examiner

SYSTEMS AND METHODS FOR AUTOMATED DYNAMIC DATABASE SEARCH QUERIES

FIELD

The present disclosure relates to systems and methods for automated dynamic database search queries.

BACKGROUND

Elasticsearch is a search engine based on the Lucene library. It provides a distributed, multitenant-capable full-text search engine with an HTTP web interface and schema-free JSON documents. Consumer applications may include user interfaces that allow a user to search a database using an Elasticsearch query. Each Elasticsearch query may use a special format that corresponds to parameters for searching the database.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for automated entity field correction includes receiving multiple search request parameters at multiple text entry fields of a user interface of an application, the multiple search request parameters corresponding to at least one of a first search query type and a second search query type, generating uniform resource locator (URL) request parameters according to the received multiple search request parameters, and dynamically building a search query by comparing the URL request parameters to multiple search query templates in a configuration file, the multiple search query templates including at least a first search query corresponding to the first search query type and a second search query corresponding to the second search query type. The method includes transmitting the dynamically built search query to a search cluster of a database, obtaining a search query result from the search cluster, and displaying the obtained search query result on the user interface of the application.

In other features, dynamically building the search query includes building an Elasticsearch query using an Elasticsearch domain specific language (DSL) library, and the search cluster includes an Elasticsearch database cluster. In other features, the user interface includes a web user interface of a consumer application, and transmitting the dynamically built search query includes executing an application programming interface (API) call to the database.

In other features, the method includes determining whether the search query result obtained from the search cluster is a valid search result, displaying the obtained search query result on the user interface of the application in response to a determination that the search query result obtained from the search cluster is a valid search result, and displaying an error alert on the user interface in response to a determination that the search query result obtained from the search cluster is not a valid search result. In other features, the method includes performing an authentication on a URL request including the generated URL request parameters, and transmitting the URL request from the application to a dynamic search query builder module in response to successful authentication.

In other features, during the authentication, the application is configured to pass a Layer 7 token in association with an application programming interface (API) request. In other features, comparing the URL request parameters to multiple search query templates in a configuration file includes identifying a matching one of the search query templates in response to a determination that each of the URL request parameters corresponds to a parameter field of the matching one of the multiple search query templates.

In other features, the URL request parameters include at least one of a project name, a dataset name, a member identifier, a customer transaction identifier, a service name, a search request date and time, a rendering provider, a national provider identifier, and a statement date. In other features, parameter fields of the multiple search query templates include at least one of a project name, a dataset name, a member identifier, a rendering provider, a national provider identifier, a statement from data, a statement to date, a statement truth date, a form type, a service denial value, a column number. In other features, the search query result includes a header having at least one of a transaction identifier, a response time, a response server, a response code, and a code description.

A computer system includes memory hardware configured to store a configuration file and computer-executable instructions, wherein the configuration file includes multiple search query templates, and processor hardware configured to execute the instructions. The instructions include receiving multiple search request parameters at multiple text entry fields of a user interface of an application, the multiple search request parameters corresponding to at least one of a first search query type and a second search query type, generating uniform resource locator (URL) request parameters according to the received multiple search request parameters, and dynamically building a search query by comparing the URL request parameters to the multiple search query templates in the configuration file, the multiple search query templates including at least a first search query corresponding to the first search query type and a second search query corresponding to the second search query type. The instructions include transmitting the dynamically built search query to a search cluster of a database, obtaining a search query result from the search cluster, and displaying the obtained search query result on the user interface of the application.

In other features, building dynamically building the search query includes building an Elasticsearch query using an Elasticsearch domain specific language (DSL) library, and the search cluster includes an Elasticsearch database cluster. In other features, the user interface includes a web user interface of a consumer application, and transmitting the dynamically built search query includes executing an application programming interface (API) call to the database.

In other features, the instructions further include determining whether the search query result obtained from the search cluster is a valid search result, displaying the obtained search query result on the user interface of the application in response to a determination that the search query result obtained from the search cluster is a valid search result, and displaying an error alert on the user interface in response to a determination that the search query result obtained from the search cluster is not a valid search result. In other features, the instructions further include performing an authentication on a URL request including the generated URL request parameters, and transmitting the URL request from the application to a dynamic search query builder module in response to successful authentication.

In other features, during the authentication, the application is configured to pass a Layer 7 token in association with an application programming interface (API) request. In other features, comparing the URL request parameters to the multiple search query templates in the configuration file includes identifying a matching one of the search query templates in response to a determination that each of the URL request parameters corresponds to a parameter field of the matching one of the multiple search query templates.

In other features, the URL request parameters include at least one of a project name, a dataset name, a member identifier, a customer transaction identifier, a service name, a search request date and time, a rendering provider, a national provider identifier, and a statement date. In other features, parameter fields of the multiple search query templates include at least one of a project name, a dataset name, a member identifier, a rendering provider, a national provider identifier, a statement from data, a statement to date, a statement truth date, a form type, a service denial value, a column number. In other features, the search query result includes a header having at least one of a transaction identifier, a response time, a response server, a response code, and a code description.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

High-Volume Pharmacy

Figure 1:
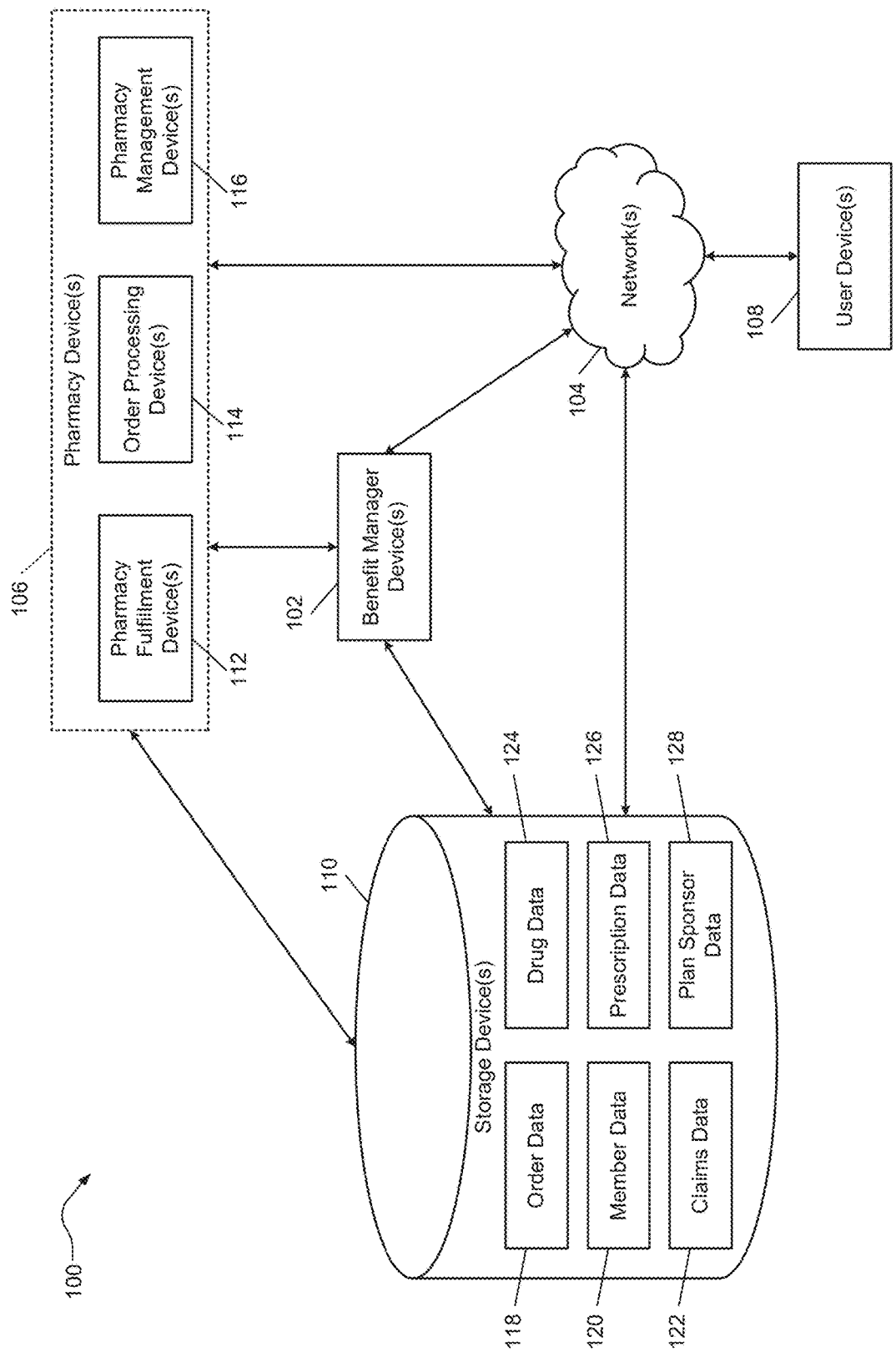
FIG. 1 is a functional block diagram of an example system including a high-volume pharmacy.

FIG. 1 is a block diagram of an example implementation of a system 100 for a high-volume pharmacy. While the system 100 is generally described as being deployed in a high-volume pharmacy or a fulfillment center (for example, a mail order pharmacy, a direct delivery pharmacy, etc.), the system 100 and/or components of the system 100 may otherwise be deployed (for example, in a lower-volume pharmacy, etc.). A high-volume pharmacy may be a pharmacy that is capable of filling at least some prescriptions mechanically. The system 100 may include a benefit manager device 102 and a pharmacy device 106 in communication with each other directly and/or over a network 104.

The system 100 may also include one or more user device(s) 108. A user, such as a pharmacist, patient, data analyst, health plan administrator, etc., may access the benefit manager device 102 or the pharmacy device 106 using the user device 108. The user device 108 may be a desktop computer, a laptop computer, a tablet, a smartphone, etc.

The benefit manager device 102 is a device operated by an entity that is at least partially responsible for creation and/or management of the pharmacy or drug benefit. While the entity operating the benefit manager device 102 is typically a pharmacy benefit manager (PBM), other entities may operate the benefit manager device 102 on behalf of themselves or other entities (such as PBMs). For example, the benefit manager device 102 may be operated by a health plan, a retail pharmacy chain, a drug wholesaler, a data analytics or other type of software-related company, etc. In some implementations, a PBM that provides the pharmacy benefit may provide one or more additional benefits including a medical or health benefit, a dental benefit, a vision benefit, a wellness benefit, a radiology benefit, a pet care benefit, an insurance benefit, a long term care benefit, a nursing home benefit, etc. The PBM may, in addition to its PBM operations, operate one or more pharmacies. The pharmacies may be retail pharmacies, mail order pharmacies, etc.

Some of the operations of the PBM that operates the benefit manager device 102 may include the following activities and processes. A member (or a person on behalf of the member) of a pharmacy benefit plan may obtain a prescription drug at a retail pharmacy location (e.g., a location of a physical store) from a pharmacist or a pharmacist technician. The member may also obtain the prescription drug through mail order drug delivery from a mail order pharmacy location, such as the system 100. In some implementations, the member may obtain the prescription drug directly or indirectly through the use of a machine, such as a kiosk, a vending unit, a mobile electronic device, or a different type of mechanical device, electrical device, electronic communication device, and/or computing device. Such a machine may be filled with the prescription drug in prescription packaging, which may include multiple prescription components, by the system 100. The pharmacy benefit plan is administered by or through the benefit manager device 102.

The member may have a copayment for the prescription drug that reflects an amount of money that the member is responsible to pay the pharmacy for the prescription drug. The money paid by the member to the pharmacy may come from, as examples, personal funds of the member, a health savings account (HSA) of the member or the member's family, a health reimbursement arrangement (HRA) of the member or the member's family, or a flexible spending account (FSA) of the member or the member's family. In some instances, an employer of the member may directly or indirectly fund or reimburse the member for the copayments.

The amount of the copayment required by the member may vary across different pharmacy benefit plans having different plan sponsors or clients and/or for different prescription drugs. The member's copayment may be a flat copayment (in one example, $10), coinsurance (in one example, 10%), and/or a deductible (for example, responsibility for the first $500 of annual prescription drug expense, etc.) for certain prescription drugs, certain types and/or classes of prescription drugs, and/or all prescription drugs. The copayment may be stored in a storage device 110 or determined by the benefit manager device 102.

In some instances, the member may not pay the copayment or may only pay a portion of the copayment for the prescription drug. For example, if a usual and customary cost for a generic version of a prescription drug is $4, and the member's flat copayment is $20 for the prescription drug, the member may only need to pay $4 to receive the prescription drug. In another example involving a worker's compensation claim, no copayment may be due by the member for the prescription drug.

In addition, copayments may also vary based on different delivery channels for the prescription drug. For example, the copayment for receiving the prescription drug from a mail order pharmacy location may be less than the copayment for receiving the prescription drug from a retail pharmacy location.

In conjunction with receiving a copayment (if any) from the member and dispensing the prescription drug to the member, the pharmacy submits a claim to the PBM for the prescription drug. After receiving the claim, the PBM (such as by using the benefit manager device 102) may perform certain adjudication operations including verifying eligibility for the member, identifying/reviewing an applicable formulary for the member to determine any appropriate copayment, coinsurance, and deductible for the prescription drug, and performing a drug utilization review (DUR) for the member. Further, the PBM may provide a response to the pharmacy (for example, the pharmacy system 100) following performance of at least some of the aforementioned operations.

As part of the adjudication, a plan sponsor (or the PBM on behalf of the plan sponsor) ultimately reimburses the pharmacy for filling the prescription drug when the prescription drug is successfully adjudicated. The aforementioned adjudication operations generally occur before the copayment is received and the prescription drug is dispensed. However, in some instances, these operations may occur simultaneously, substantially simultaneously, or in a different order. In addition, more or fewer adjudication operations may be performed as at least part of the adjudication process.

The amount of reimbursement paid to the pharmacy by a plan sponsor and/or money paid by the member may be determined at least partially based on types of pharmacy networks in which the pharmacy is included. In some implementations, the amount may also be determined based on other factors. For example, if the member pays the pharmacy for the prescription drug without using the prescription or drug benefit provided by the PBM, the amount of money paid by the member may be higher than when the member uses the prescription or drug benefit. In some implementations, the amount of money received by the pharmacy for dispensing the prescription drug and for the prescription drug itself may be higher than when the member uses the prescription or drug benefit. Some or all of the foregoing operations may be performed by executing instructions stored in the benefit manager device 102 and/or an additional device.

Examples of the network 104 include a Global System for Mobile Communications (GSM) network, a code division multiple access (CDMA) network, 3rd Generation Partnership Project (3GPP), an Internet Protocol (IP) network, a Wireless Application Protocol (WAP) network, or an IEEE 802.11 standards network, as well as various combinations of the above networks. The network 104 may include an optical network. The network 104 may be a local area network or a global communication network, such as the Internet. In some implementations, the network 104 may include a network dedicated to prescription orders: a prescribing network such as the electronic prescribing network operated by Surescripts of Arlington, Virginia.

Moreover, although the system shows a single network 104, multiple networks can be used. The multiple networks may communicate in series and/or parallel with each other to link the devices 102-110.

The pharmacy device 106 may be a device associated with a retail pharmacy location (e.g., an exclusive pharmacy location, a grocery store with a retail pharmacy, or a general sales store with a retail pharmacy) or other type of pharmacy location at which a member attempts to obtain a prescription. The pharmacy may use the pharmacy device 106 to submit the claim to the PBM for adjudication.

Additionally, in some implementations, the pharmacy device 106 may enable information exchange between the pharmacy and the PBM. For example, this may allow the sharing of member information such as drug history that may allow the pharmacy to better service a member (for example, by providing more informed therapy consultation and drug interaction information). In some implementations, the benefit manager device 102 may track prescription drug fulfillment and/or other information for users that are not members, or have not identified themselves as members, at the time (or in conjunction with the time) in which they seek to have a prescription filled at a pharmacy.

The pharmacy device 106 may include a pharmacy fulfillment device 112, an order processing device 114, and a pharmacy management device 116 in communication with each other directly and/or over the network 104. The order processing device 114 may receive information regarding filling prescriptions and may direct an order component to one or more devices of the pharmacy fulfillment device 112 at a pharmacy. The pharmacy fulfillment device 112 may fulfill, dispense, aggregate, and/or pack the order components of the prescription drugs in accordance with one or more prescription orders directed by the order processing device 114.

In general, the order processing device 114 is a device located within or otherwise associated with the pharmacy to enable the pharmacy fulfillment device 112 to fulfill a prescription and dispense prescription drugs. In some implementations, the order processing device 114 may be an external order processing device separate from the pharmacy and in communication with other devices located within the pharmacy.

For example, the external order processing device may communicate with an internal pharmacy order processing device and/or other devices located within the system 100. In some implementations, the external order processing device may have limited functionality (e.g., as operated by a user requesting fulfillment of a prescription drug), while the internal pharmacy order processing device may have greater functionality (e.g., as operated by a pharmacist).

The order processing device 114 may track the prescription order as it is fulfilled by the pharmacy fulfillment device 112. The prescription order may include one or more prescription drugs to be filled by the pharmacy. The order processing device 114 may make pharmacy routing decisions and/or order consolidation decisions for the particular prescription order. The pharmacy routing decisions include what device(s) in the pharmacy are responsible for filling or otherwise handling certain portions of the prescription order. The order consolidation decisions include whether portions of one prescription order or multiple prescription orders should be shipped together for a user or a user family. The order processing device 114 may also track and/or schedule literature or paperwork associated with each prescription order or multiple prescription orders that are being shipped together. In some implementations, the order processing device 114 may operate in combination with the pharmacy management device 116.

The order processing device 114 may include circuitry, a processor, a memory to store data and instructions, and communication functionality. The order processing device 114 is dedicated to performing processes, methods, and/or instructions described in this application. Other types of electronic devices may also be used that are specifically configured to implement the processes, methods, and/or instructions described in further detail below.

In some implementations, at least some functionality of the order processing device 114 may be included in the pharmacy management device 116. The order processing device 114 may be in a client-server relationship with the pharmacy management device 116, in a peer-to-peer relationship with the pharmacy management device 116, or in a different type of relationship with the pharmacy management device 116. The order processing device 114 and/or the pharmacy management device 116 may communicate directly (for example, such as by using a local storage) and/or through the network 104 (such as by using a cloud storage configuration, software as a service, etc.) with the storage device 110.

The storage device 110 may include: non-transitory storage (for example, memory, hard disk, CD-ROM, etc.) in communication with the benefit manager device 102 and/or the pharmacy device 106 directly and/or over the network 104. The non-transitory storage may store order data 118, member data 120, claims data 122, drug data 124, prescription data 126, and/or plan sponsor data 128. Further, the system 100 may include additional devices, which may communicate with each other directly or over the network 104.

The order data 118 may be related to a prescription order. The order data may include type of the prescription drug (for example, drug name and strength) and quantity of the prescription drug. The order data 118 may also include data used for completion of the prescription, such as prescription materials. In general, prescription materials include an electronic copy of information regarding the prescription drug for inclusion with or otherwise in conjunction with the fulfilled prescription. The prescription materials may include electronic information regarding drug interaction warnings, recommended usage, possible side effects, expiration date, date of prescribing, etc. The order data 118 may be used by a high-volume fulfillment center to fulfill a pharmacy order.

In some implementations, the order data 118 includes verification information associated with fulfillment of the prescription in the pharmacy. For example, the order data 118 may include videos and/or images taken of (i) the prescription drug prior to dispensing, during dispensing, and/or after dispensing, (ii) the prescription container (for example, a prescription container and sealing lid, prescription packaging, etc.) used to contain the prescription drug prior to dispensing, during dispensing, and/or after dispensing, (iii) the packaging and/or packaging materials used to ship or otherwise deliver the prescription drug prior to dispensing, during dispensing, and/or after dispensing, and/or (iv) the fulfillment process within the pharmacy. Other types of verification information such as barcode data read from pallets, bins, trays, or carts used to transport prescriptions within the pharmacy may also be stored as order data 118.

The member data 120 includes information regarding the members associated with the PBM. The information stored as member data 120 may include personal information, personal health information, protected health information, etc. Examples of the member data 120 include name, address, telephone number, e-mail address, prescription drug history, etc. The member data 120 may include a plan sponsor identifier that identifies the plan sponsor associated with the member and/or a member identifier that identifies the member to the plan sponsor. The member data 120 may include a member identifier that identifies the plan sponsor associated with the user and/or a user identifier that identifies the user to the plan sponsor. The member data 120 may also include dispensation preferences such as type of label, type of cap, message preferences, language preferences, etc.

The member data 120 may be accessed by various devices in the pharmacy (for example, the high-volume fulfillment center, etc.) to obtain information used for fulfillment and shipping of prescription orders. In some implementations, an external order processing device operated by or on behalf of a member may have access to at least a portion of the member data 120 for review, verification, or other purposes.

In some implementations, the member data 120 may include information for persons who are users of the pharmacy but are not members in the pharmacy benefit plan being provided by the PBM. For example, these users may obtain drugs directly from the pharmacy, through a private label service offered by the pharmacy, the high-volume fulfillment center, or otherwise. In general, the terms "member" and "user" may be used interchangeably.

The claims data 122 includes information regarding pharmacy claims adjudicated by the PBM under a drug benefit program provided by the PBM for one or more plan sponsors. In general, the claims data 122 includes an identification of the client that sponsors the drug benefit program under which the claim is made, and/or the member that purchased the prescription drug giving rise to the claim, the prescription drug that was filled by the pharmacy (e.g., the national drug code number, etc.), the dispensing date, generic indicator, generic product identifier (GPI) number, medication class, the cost of the prescription drug provided under the drug benefit program, the copayment/coinsurance amount, rebate information, and/or member eligibility, etc. Additional information may be included.

In some implementations, other types of claims beyond prescription drug claims may be stored in the claims data 122. For example, medical claims, dental claims, wellness claims, or other types of health-care-related claims for members may be stored as a portion of the claims data 122.

In some implementations, the claims data 122 includes claims that identify the members with whom the claims are associated. Additionally, or alternatively, the claims data 122 may include claims that have been de-identified (that is, associated with a unique identifier but not with a particular, identifiable member).

The drug data 124 may include drug name (e.g., technical name and/or common name), other names by which the drug is known, active ingredients, an image of the drug (such as in pill form), etc. The drug data 124 may include information associated with a single medication or multiple medications.

The prescription data 126 may include information regarding prescriptions that may be issued by prescribers on behalf of users, who may be members of the pharmacy benefit plan—for example, to be filled by a pharmacy. Examples of the prescription data 126 include user names, medication or treatment (such as lab tests), dosing information, etc. The prescriptions may include electronic prescriptions or paper prescriptions that have been scanned. In some implementations, the dosing information reflects a frequency of use (e.g., once a day, twice a day, before each meal, etc.) and a duration of use (e.g., a few days, a week, a few weeks, a month, etc.).

In some implementations, the order data 118 may be linked to associated member data 120, claims data 122, drug data 124, and/or prescription data 126.

The plan sponsor data 128 includes information regarding the plan sponsors of the PBM. Examples of the plan sponsor data 128 include company name, company address, contact name, contact telephone number, contact e-mail address, etc.

Figure 2:
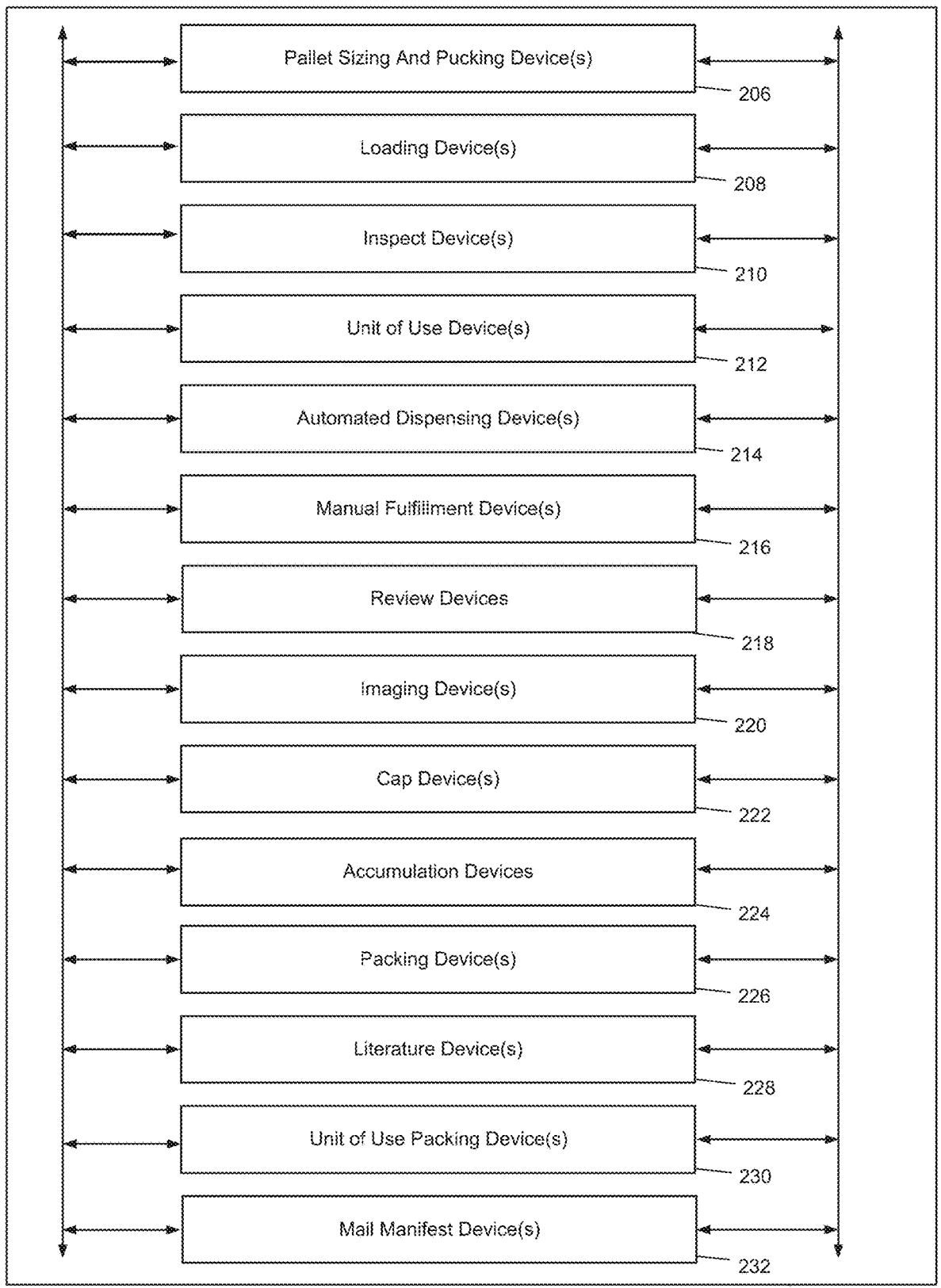
FIG. 2 is a functional block diagram of an example pharmacy fulfillment device, which may be deployed within the system of FIG. 1.

FIG. 2 illustrates the pharmacy fulfillment device 112 according to an example implementation. The pharmacy fulfillment device 112 may be used to process and fulfill prescriptions and prescription orders. After fulfillment, the fulfilled prescriptions are packed for shipping.

The pharmacy fulfillment device 112 may include devices in communication with the benefit manager device 102, the order processing device 114, and/or the storage device 110, directly or over the network 104. Specifically, the pharmacy fulfillment device 112 may include pallet sizing and pucking device(s) 206, loading device(s) 208, inspect device(s) 210, unit of use device(s) 212, automated dispensing device(s) 214, manual fulfillment device(s) 216, review devices 218, imaging device(s) 220, cap device(s) 222, accumulation devices 224, packing device(s) 226, literature device(s) 228, unit of use packing device(s) 230, and mail manifest device(s) 232. Further, the pharmacy fulfillment device 112 may include additional devices, which may communicate with each other directly or over the network 104.

In some implementations, operations performed by one of these devices 206-232 may be performed sequentially, or in parallel with the operations of another device as may be coordinated by the order processing device 114. In some implementations, the order processing device 114 tracks a prescription with the pharmacy based on operations performed by one or more of the devices 206-232.

In some implementations, the pharmacy fulfillment device 112 may transport prescription drug containers, for example, among the devices 206-232 in the high-volume fulfillment center, by use of pallets. The pallet sizing and pucking device 206 may configure pucks in a pallet. A pallet may be a transport structure for a number of prescription containers, and may include a number of cavities. A puck may be placed in one or more than one of the cavities in a pallet by the pallet sizing and pucking device 206. The puck may include a receptacle sized and shaped to receive a prescription container. Such containers may be supported by the pucks during carriage in the pallet. Different pucks may have differently sized and shaped receptacles to accommodate containers of differing sizes, as may be appropriate for different prescriptions.

The arrangement of pucks in a pallet may be determined by the order processing device 114 based on prescriptions that the order processing device 114 decides to launch. The arrangement logic may be implemented directly in the pallet sizing and pucking device 206. Once a prescription is set to be launched, a puck suitable for the appropriate size of container for that prescription may be positioned in a pallet by a robotic arm or pickers. The pallet sizing and pucking device 206 may launch a pallet once pucks have been configured in the pallet.

The loading device 208 may load prescription containers into the pucks on a pallet by a robotic arm, a pick and place mechanism (also referred to as pickers), etc. In various implementations, the loading device 208 has robotic arms or pickers to grasp a prescription container and move it to and from a pallet or a puck. The loading device 208 may also print a label that is appropriate for a container that is to be loaded onto the pallet, and apply the label to the container. The pallet may be located on a conveyor assembly during these operations (e.g., at the high-volume fulfillment center, etc.).

The inspect device 210 may verify that containers in a pallet are correctly labeled and in the correct spot on the pallet. The inspect device 210 may scan the label on one or more containers on the pallet. Labels of containers may be scanned or imaged in full or in part by the inspect device 210. Such imaging may occur after the container has been lifted out of its puck by a robotic arm, picker, etc., or may be otherwise scanned or imaged while retained in the puck. In some implementations, images and/or video captured by the inspect device 210 may be stored in the storage device 110 as order data 118.

The unit of use device 212 may temporarily store, monitor, label, and/or dispense unit of use products. In general, unit of use products are prescription drug products that may be delivered to a user or member without being repackaged at the pharmacy. These products may include pills in a container, pills in a blister pack, inhalers, etc. Prescription drug products dispensed by the unit of use device 212 may be packaged individually or collectively for shipping, or may be shipped in combination with other prescription drugs dispensed by other devices in the high-volume fulfillment center.

At least some of the operations of the devices 206-232 may be directed by the order processing device 114. For example, the manual fulfillment device 216, the review device 218, the automated dispensing device 214, and/or the packing device 226, etc. may receive instructions provided by the order processing device 114.

The automated dispensing device 214 may include one or more devices that dispense prescription drugs or pharmaceuticals into prescription containers in accordance with one or multiple prescription orders. In general, the automated dispensing device 214 may include mechanical and electronic components with, in some implementations, software and/or logic to facilitate pharmaceutical dispensing that would otherwise be performed in a manual fashion by a pharmacist and/or pharmacist technician. For example, the automated dispensing device 214 may include high-volume fillers that fill a number of prescription drug types at a rapid rate and blister pack machines that dispense and pack drugs into a blister pack. Prescription drugs dispensed by the automated dispensing devices 214 may be packaged individually or collectively for shipping, or may be shipped in combination with other prescription drugs dispensed by other devices in the high-volume fulfillment center.

The manual fulfillment device 216 controls how prescriptions are manually fulfilled. For example, the manual fulfillment device 216 may receive or obtain a container and enable fulfillment of the container by a pharmacist or pharmacy technician. In some implementations, the manual fulfillment device 216 provides the filled container to another device in the pharmacy fulfillment devices 112 to be joined with other containers in a prescription order for a user or member.

In general, manual fulfillment may include operations at least partially performed by a pharmacist or a pharmacy technician. For example, a person may retrieve a supply of the prescribed drug, may make an observation, may count out a prescribed quantity of drugs and place them into a prescription container, etc. Some portions of the manual fulfillment process may be automated by use of a machine. For example, counting of capsules, tablets, or pills may be at least partially automated (such as through use of a pill counter). Prescription drugs dispensed by the manual fulfillment device 216 may be packaged individually or collectively for shipping, or may be shipped in combination with other prescription drugs dispensed by other devices in the high-volume fulfillment center.

The review device 218 may process prescription containers to be reviewed by a pharmacist for proper pill count, exception handling, prescription verification, etc. Fulfilled prescriptions may be manually reviewed and/or verified by a pharmacist, as may be required by state or local law. A pharmacist or other licensed pharmacy person who may dispense certain drugs in compliance with local and/or other laws may operate the review device 218 and visually inspect a prescription container that has been filled with a prescription drug. The pharmacist may review, verify, and/or evaluate drug quantity, drug strength, and/or drug interaction concerns, or otherwise perform pharmacist services. The pharmacist may also handle containers which have been flagged as an exception, such as containers with unreadable labels, containers for which the associated prescription order has been canceled, containers with defects, etc. In an example, the manual review can be performed at a manual review station.

The imaging device 220 may image containers once they have been filled with pharmaceuticals. The imaging device 220 may measure a fill height of the pharmaceuticals in the container based on the obtained image to determine if the container is filled to the correct height given the type of pharmaceutical and the number of pills in the prescription. Images of the pills in the container may also be obtained to detect the size of the pills themselves and markings thereon. The images may be transmitted to the order processing device 114 and/or stored in the storage device 110 as part of the order data 118.

The cap device 222 may be used to cap or otherwise seal a prescription container. In some implementations, the cap device 222 may secure a prescription container with a type of cap in accordance with a user preference (e.g., a preference regarding child resistance, etc.), a plan sponsor preference, a prescriber preference, etc. The cap device 222 may also etch a message into the cap, although this process may be performed by a subsequent device in the high-volume fulfillment center.

The accumulation device 224 accumulates various containers of prescription drugs in a prescription order. The accumulation device 224 may accumulate prescription containers from various devices or areas of the pharmacy. For example, the accumulation device 224 may accumulate prescription containers from the unit of use device 212, the automated dispensing device 214, the manual fulfillment device 216, and the review device 218. The accumulation device 224 may be used to group the prescription containers prior to shipment to the member.

The literature device 228 prints, or otherwise generates, literature to include with each prescription drug order. The literature may be printed on multiple sheets of substrates, such as paper, coated paper, printable polymers, or combinations of the above substrates. The literature printed by the literature device 228 may include information required to accompany the prescription drugs included in a prescription order, other information related to prescription drugs in the order, financial information associated with the order (for example, an invoice or an account statement), etc.

In some implementations, the literature device 228 folds or otherwise prepares the literature for inclusion with a prescription drug order (e.g., in a shipping container). In other implementations, the literature device 228 prints the literature and is separate from another device that prepares the printed literature for inclusion with a prescription order.

The packing device 226 packages the prescription order in preparation for shipping the order. The packing device 226 may box, bag, or otherwise package the fulfilled prescription order for delivery. The packing device 226 may further place inserts (e.g., literature or other papers, etc.) into the packaging received from the literature device 228. For example, bulk prescription orders may be shipped in a box, while other prescription orders may be shipped in a bag, which may be a wrap seal bag.

The packing device 226 may label the box or bag with an address and a recipient's name. The label may be printed and affixed to the bag or box, be printed directly onto the bag or box, or otherwise associated with the bag or box. The packing device 226 may sort the box or bag for mailing in an efficient manner (e.g., sort by delivery address, etc.). The packing device 226 may include ice or temperature sensitive elements for prescriptions that are to be kept within a temperature range during shipping (for example, this may be necessary in order to retain efficacy). The ultimate package may then be shipped through postal mail, through a mail order delivery service that ships via ground and/or air (e.g., UPS, FEDEX, or DHL, etc.), through a delivery service, through a locker box at a shipping site (e.g., AMAZON locker or a PO Box, etc.), or otherwise.

The unit of use packing device 230 packages a unit of use prescription order in preparation for shipping the order. The unit of use packing device 230 may include manual scanning of containers to be bagged for shipping to verify each container in the order. In an example implementation, the manual scanning may be performed at a manual scanning station. The pharmacy fulfillment device 112 may also include a mail manifest device 232 to print mailing labels used by the packing device 226 and may print shipping manifests and packing lists.

While the pharmacy fulfillment device 112 in FIG. 2 is shown to include single devices 206-232, multiple devices may be used. When multiple devices are present, the multiple devices may be of the same device type or models, or may be a different device type or model. The types of devices 206-232 shown in FIG. 2 are example devices. In other configurations of the system 100, lesser, additional, or different types of devices may be included.

Moreover, multiple devices may share processing and/or memory resources. The devices 206-232 may be located in the same area or in different locations. For example, the devices 206-232 may be located in a building or set of adjoining buildings. The devices 206-232 may be interconnected (such as by conveyors), networked, and/or otherwise in contact with one another or integrated with one another (e.g., at the high-volume fulfillment center, etc.). In addition, the functionality of a device may be split among a number of discrete devices and/or combined with other devices.

Figure 3:
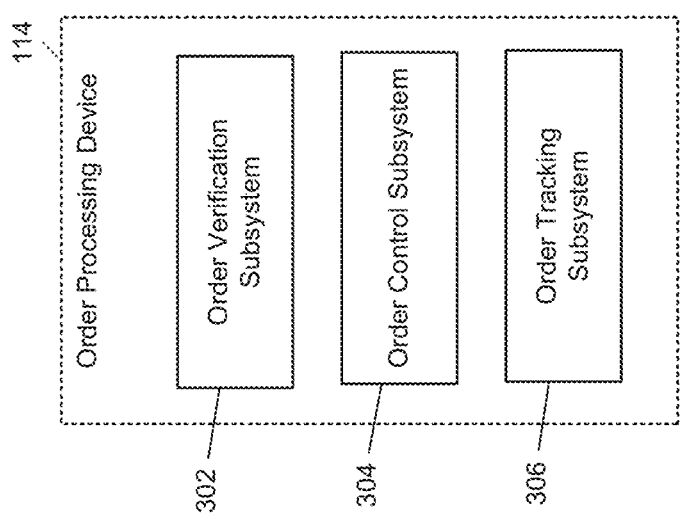
FIG. 3 is a functional block diagram of an example order processing device, which may be deployed within the system of FIG. 1.

FIG. 3 illustrates the order processing device 114 according to an example implementation. The order processing device 114 may be used by one or more operators to generate prescription orders, make routing decisions, make prescription order consolidation decisions, track literature with the system 100, and/or view order status and other order related information. For example, the prescription order may be comprised of order components.

The order processing device 114 may receive instructions to fulfill an order without operator intervention. An order component may include a prescription drug fulfilled by use of a container through the system 100. The order processing device 114 may include an order verification subsystem 302, an order control subsystem 304, and/or an order tracking subsystem 306. Other subsystems may also be included in the order processing device 114.

The order verification subsystem 302 may communicate with the benefit manager device 102 to verify the eligibility of the member and review the formulary to determine appropriate copayment, coinsurance, and deductible for the prescription drug and/or perform a DUR (drug utilization review). Other communications between the order verification subsystem 302 and the benefit manager device 102 may be performed for a variety of purposes.

The order control subsystem 304 controls various movements of the containers and/or pallets along with various filling functions during their progression through the system 100. In some implementations, the order control subsystem 304 may identify the prescribed drug in one or more than one prescription orders as capable of being fulfilled by the automated dispensing device 214. The order control subsystem 304 may determine which prescriptions are to be launched and may determine that a pallet of automated-fill containers is to be launched.

The order control subsystem 304 may determine that an automated-fill prescription of a specific pharmaceutical is to be launched and may examine a queue of orders awaiting fulfillment for other prescription orders, which will be filled with the same pharmaceutical. The order control subsystem 304 may then launch orders with similar automated-fill pharmaceutical needs together in a pallet to the automated dispensing device 214. As the devices 206-232 may be interconnected by a system of conveyors or other container movement systems, the order control subsystem 304 may control various conveyors: for example, to deliver the pallet from the loading device 208 to the manual fulfillment device 216 from the literature device 228, paperwork as needed to fill the prescription.

The order tracking subsystem 306 may track a prescription order during its progress toward fulfillment. The order tracking subsystem 306 may track, record, and/or update order history, order status, etc. The order tracking subsystem 306 may store data locally (for example, in a memory) or as a portion of the order data 118 stored in the storage device 110.

Automated Database Search Query System

Figure 4:
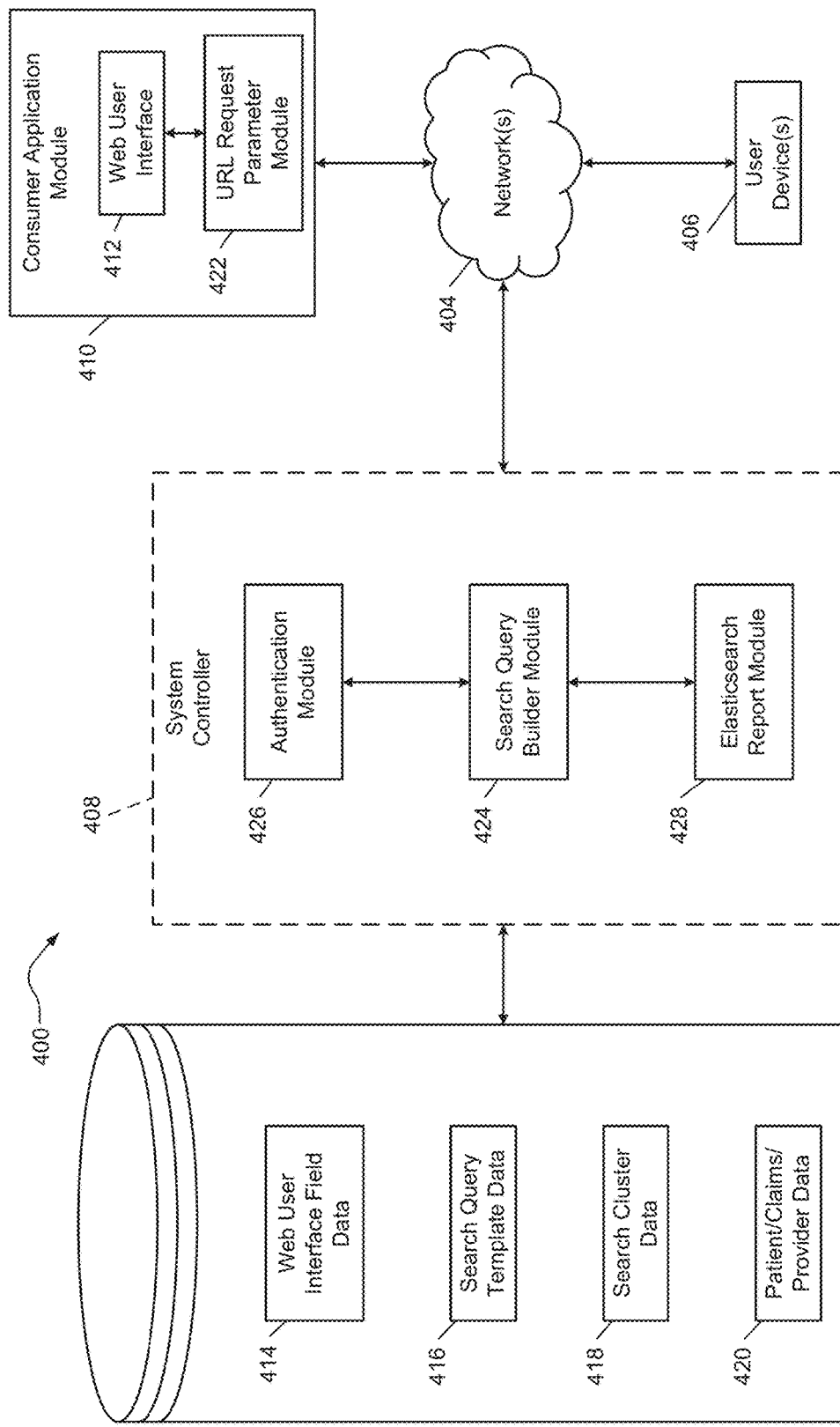
FIG. 4 is a functional block diagram of an example system for automated dynamic database search queries.

FIG. 4 is a functional block diagram of an example system 400 for automated generation of dynamic database search queries, which includes a database 402. While the system 400 is generally described as being deployed in a computer network system, the database 402 and/or components of the system 400 may otherwise be deployed (for example, as a standalone computer setup). The system 400 may include a desktop computer, a laptop computer, a tablet, a smartphone, etc.

As shown in FIG. 4, the database 402 stores web user interface (UI) field data 414, search query template data 416, search cluster data 418, and patient/claims/provider data 420. In various implementations, the database 402 may store other types of data as well. The web user interface (UI) field data 414, search query template data 416, search cluster data 418, and patient/claims/provider data 420 may be located in different physical memories within the database 402, such as different random access memory (RAM), read-only memory (ROM), a non-volatile hard disk or flash memory, etc. In some implementations, the web user interface (UI) field data 414, search query template data 416, search cluster data 418, and patient/claims/provider data 420 may be located in the same memory (such as in different address ranges of the same memory). In various implementations, the web user interface (UI) field data 414, search query template data 416, search cluster data 418, and patient/claims/provider data 420 may each be stored as structured or unstructured data in any suitable type of data store.

The web user interface field data 414 may include any suitable data for defining entry fields of, e.g., a web user interface 412 of a consumer application module 410 (such as an application that a user may control to obtain information from the database 402 and/or other databases). The web user interface field data 414 may include text entry fields, input buttons, a template of one or more arrangements of various lists, tables, etc. For example, the web user interface field data 414 may include a first layout of entry fields for searching patient data, a second layout of entry fields associated with searching provider data, etc.

The search query template data 416 may include any suitable data for specifying search queries to a database, such as formatting of parameters of various application programming interface (API) calls to a database to search different types of information. For example, a first API format may use a first arrangement of parameters to search for patient data from a database, may use a second arrangement of parameters to request provider data from a database, etc.

In various implementations, the search query template data 416 may include one or more configuration files that map data from input entry fields of a web UI, to a corresponding API for querying a database. For example, a configuration file may map a first layout of input fields of the web UI to a first API call format for querying a database regarding patient information, may map a second layout of input fields of the web UI to a second API call format for querying a database regarding provider information, may map a third layout of the web UI to a third API call format for querying a database regarding claims information, etc.

For example, a system controller 408 may be configured to dynamically build search query statements at runtime (such as Elasticsearch query API calls), based on inputs received from the web user interface 412. As shown in FIG. 4, the system controller 408 may include one or more modules, including a search query builder module 424, an authentication module 426, and an Elasticsearch report module 428.

The consumer application module may include any suitable interfaces and modules, such as the web user interface 412 and a uniform resource locator (URL) parameter module 422. Although FIG. 4 illustrates the URL request parameter module 422 as being located in the consumer application module 410, in other implementations the URL request parameter module 422 may be located in the system controller 408, or any other suitable location.

The URL request parameter module 422 may be configured to obtain input from a user via the web user interface 412 of the consumer application module. For example, a user may enter desired search criteria in entry fields of the web user interface 412, and the URL request parameter module 422 may identify an arrangement and content of the entry fields. Example URL request parameters may include, but are not limited to, a project name, a dataset name, a member identifier, a consumer transaction identifier, a service name, a request date and time, etc.

Every use case (e.g., every different type of search request) may have different metadata (e.g., URL request fields), and in a request header the application may pass data using JWT. In some example embodiments, business metrics may be used to specify search formats, where a JSON format is used to dynamically take the input data from the user and translate it into a URL. Different types of searches may be selected by a user in the web user interface 412.

If the URL request parameter module 422 determines that the entry fields of the web user interface 412 are arranged in, e.g., a format for searching patient data in a database, the URL request parameter module 422 may specify the arrangement and the specific data entered in the fields, to the search query builder module 424. The search query builder module 424 may then build a search query based on the inputs received via the web user interface 412. Although FIG. 4 illustrates a web user interface 412 of a consumer application module 410, it should be appreciated that other embodiments may include other types of interfaces for receiving input regarding search requests, and other types of applications may be used to receive the input for performing desired search requests.

The search query builder module 424 may build the search request using one more configuration files. Each configuration file may specify a mapping of types, formats, lists, etc. of the user input from the web user interface 412, to different search queries. For example, a configuration file may specify that when a first combination of input data is received, the search query should be a patient data API request, and when a second combination of input data is received, the search query should be a provider data API request.

In some example embodiments, a validation module may be implemented before the search query builder module 424, after the search query builder module 424, and/or with the search query builder module 424. For example, the validation module may perform various rule checks to confirm that data from the URL request parameter module 422 is in a proper format, data from the search query builder module 424 is in a proper format, etc.

The configuration file(s) may be developed by an administrator of the system 400, and stored in the database 402 (such as in the search query template data 416). The configuration file(s) may include one or more business rules, algorithms, etc., for identifying a number of input entry fields in the URL parameter request, a type or layout of the input entry fields, types of data included in the input entry fields, etc. The configuration file(s) may store mappings of the identified input entry fields to different ones of multiple search query API requests.

As an example, a configuration file may include {"ProjectName":"ClaimEligibility", "DatasetName":"gov-claim-elg-index", "MemberId":["35846182"], "CustomerTransactionId": "123456", "ServiceName": "TI52369", "ReqDateTime": "2022-03-28 120315", "DosFrom": ["2019-05-01"], "DosTo":["2019-05-05"], "RenderingProviderNPI": ["1619918489"], "RenderingProviderFtin": ["741577569"]}. The configuration file may be a key value pair. For example, based on a project name, the configuration file may determine that a search request is a claim related API. As another example, based on a dataset name, the configuration file may determine that a JSON file is coming out of the Elasticsearch index.

In various implementations, a system administrator may generate or modify the configuration file(s) by accessing the system controller 408 via the user device 406. The user device 406 may include any suitable user device for displaying text and receiving input from a user, including a desktop computer, a laptop computer, a tablet, a smartphone, etc. In various implementations, the user device 406 may access the database 402 or the system controller 408 directly, or may access the database 402 or the system controller 408 through one or more networks 404. Example networks may include a wireless network, a local area network (LAN), the Internet, a cellular network, etc.

The system controller 408 includes an authentication module 426. The authentication module 426 may include any suitable authentication features for, e.g., authenticating users of the consumer application module 410, authenticating access to a search database, etc. An example authentication protocol includes, but is not limited to, layer 7 authentication, using a Route 53 record of Amazon Web Services (AWS), a Lambda authorizer with a JavaScript Object Notation (JSON) Web Token (JWT), one or more API requests, etc.

In various implementations, the consumer application module 410 may be registered with a Layer 7 application to receive a token. During a request to an API gateway, the application may pass the token, where the API receives the token and passes it to the Layer 7 application to get authenticated.

The system controller 408 also includes an Elasticsearch report module 428. The Elasticsearch report module 428 may be configured to submit a build API search query to a database (such as an Elasticsearch cluster), and return results of the search to the web user interface 412 of the consumer application module 410. For example, the URL request parameter module 422 may generate or track a transaction identifier (ID) for each search request that is received from the web user interface. The transaction ID may be preserved by the search query builder module 424, the authentication module 426, and the Elasticsearch report module 428, so that search results returned to the web user interface 412 (e.g., via a search report from the Elasticsearch report module 428) may be returned to a proper instance of the web user interface 412 associated with the transaction ID (to make sure that the user requesting data receives the correct search results).

FIG. 4 illustrates the database 402 as including search cluster data 418 and patient/claims/provider data 420. The search cluster data 418 may include information about a location, address, etc. of one or more databases for searching via API search queries built by the search query builder module 424. For example, the system controller 408 may be directed to specific cluster(s) for searching information, and different clusters may be specified by the search query builder module 424 (e.g., patient data searches may be directed to a patient database cluster at a first address, provider data searches may be directed to a provider database cluster at a second address, etc.). In various implementations, different clusters may be decided based on different dataset names. For example, gov-claim-elg-index may be part of claim related Elasticsearch domain cluster names.

The patient/claims/provider data 420 may include any suitable data that a user may want to search for via the web user interface 412. For example, the patient/claims/provider data 420 may include information about various patient details of patients treated by a provider, may include information about various providers that provide medical care and/or prescription drug care services, information about various claims and medical/prescription drug history of patients, etc. The patient/claims/provider data 420 may be located in the same database 402 as other data illustrated in FIG. 4, or may be located in one or more other suitable databases. Although FIG. 4 refers to making API searches of Elasticsearch clusters, other implementations may use other formats for search queries, may search databased storing data in other formats, etc.

Referring to the Elasticsearch example, Elasticsearch is a search engine based on the Lucene library, which provides a distributed, multitenant-capable full-text search engine with a hypertext transfer protocol (HTTP) web interface and schema-free JSON documents. Elasticsearch is developed in Java, and has clients available in Java, .NET, PHP, Python, Ruby, and many other languages. Elasticsearch may be used to search any kind of document. It provides scalable search, has near real-time search, and supports multitenancy.

Elasticsearch is distributed, which means that indices can be divided into shards and each shard can have zero or more replicas. Each node hosts one or more shards and acts as a coordinator to delegate operations to the correct shard(s). Rebalancing and routing may be done automatically. Related data may be stored in the same index, which consists of one or more primary shards, and zero or more replica shards. Once an index has been created, the number of primary shards may not be changed.

Elasticsearch is developed alongside the data collection and log-parsing engine Logstash, the analytics and visualization platform Kibana, and the collection of lightweight data shippers called Beats. The four products may be used as an integrated solution. Elasticsearch uses Lucene and makes its features available through the JSON and Java API. It supports faceting and percolating (a form of prospective search), which can be useful for notifying if new documents match for registered queries. There system may maintain a gateway long-term persistence of the index. For example, an index can be recovered from the gateway in the event of a server crash. Elasticsearch supports real-time GET requests, which makes it suitable as a NoSQL datastore.

In the examples described herein, the search query builder module 424 and other modules of the system controller 408 may be used to automatically generate search queries dynamically at runtime to account for various types of searches received from the web user interface. This improves technical operation of the system 400, because instead of maintaining multiple search request configurations for each different type of possible search request of the web user interface, a single module may be used to dynamically build the search requests at runtime. Instead of requiring five, ten, etc. different applications with a separate application for each type of search report, example embodiments described herein may reduce computing resources by using an intelligent query builder that converts a search request into language that, e.g., the Elasticsearch engine can understand, therefore using, for example, only one application and pipeline from the consumer application module 410 to the database storing the searched data.

Figure 5:
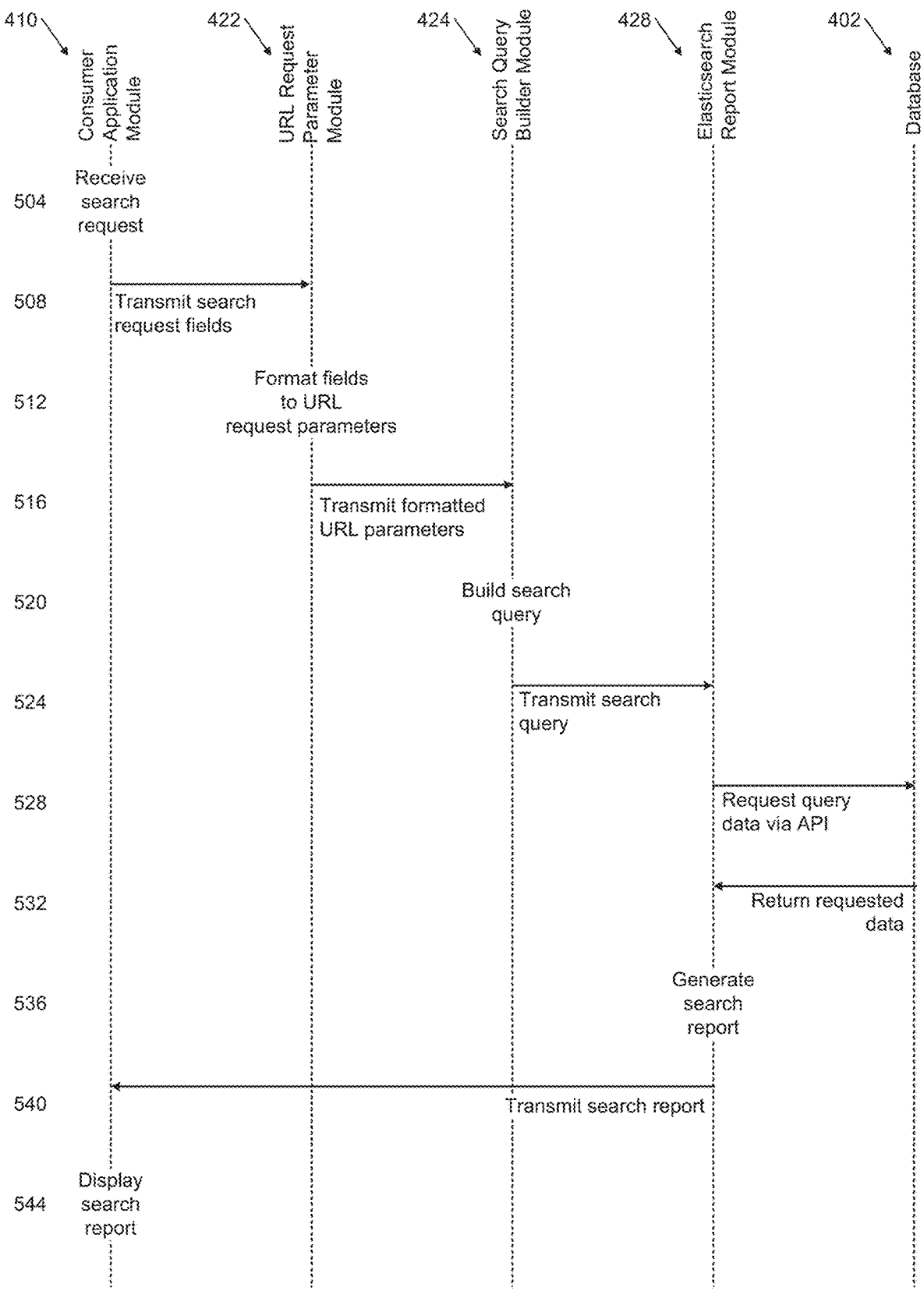
FIG. 5 is a message sequence chart illustrating example interactions between components of the system of FIG. 4.

FIG. 5 is a message sequence chart illustrating example interactions between the consumer application module 410, the URL request parameter module 422, the search query builder module 424, the Elasticsearch report module 428, and the database 402. At line 504, the consumer application module 410 receives a search request. For example, a user may enter search parameters into text entry fields of a web user interface, such as the web user interface 412 of FIG. 4.

At line 508, the consumer application module 410 transmits the search request fields to the URL request parameter module 422. The URL request parameter module then formats the fields into URL request parameters at line 512. Although FIGS. 4 and 5 illustrate the consumer application module 410, the URL request parameter module 422, the search query builder module 424, the Elasticsearch report module 428 as different modules, in various implementations the different modules may be part of the same computer system, various functions may be performed by a single module, a software instance may perform functions of various modules, etc.

The URL request parameter module 422 transmits the formatted URL parameters to the search query builder module 424 at line 516. For example, the URL request parameter module 422 may convert text received at the entry fields of the web user interface 412 into a URL request, where parameters of the URL request are formatted into an arrangement for building a search query.

In various implementations, the input from the user may be built into an appropriate URL along with a request header, security tokens, and a request body. As an example, user input may be built into a URL (e.g., https://d-edp-evernorth.dev.internal.digitaledge.evernorth.com/v1/fetchelasticresults), a request header, and passed with security authentication JSON web token (JWT). The request body may be built based on the user input values, such as {"ProjectName":"ClaimEligibility", "DatasetName":"gov-claim-cxt", "MemberId":["35846182"], "CustomerTransactionId": "123456", "ServiceName": "TI52369", "ReqDateTime": "2022-03-28 120315", "DosFrom":["2019-05-01"], "DosTo":["2019-05-05"], "RenderingProviderNPI": ["1619918489"], "RenderingProviderFtin": ["741577569"]}.

At line 520, the search query builder module 424 builds a search query. For example, the search query builder module 424 may compare parameters of the URL request received from the URL request parameter module 422 to multiple search query templates in a configuration file, in order to determine which type of search query to build based on the request parameters.

The search query builder module 424 may use an Elasticsearch domain specific language (DSL) library to build the search query dynamically during runtime. For example, the URL request parameters may be compared with fields of a template in a configuration file. Example configuration file fields may include, but are not limited to, a project name, a dataset name, a member identifier, a rendering provider, a national provider identifier, a statement from data, a statement to date, a statement truth date, a form type, a service denial value, a column number, etc.

The search query builder module 424 transmits the search query to the Elasticsearch report module 428 at line 524. The Elasticsearch report module then requests query data from the database 402 at line 528, and the database 402 returns the requested data at line 532.

Although FIG. 5 illustrates the database 402 returning data for the search query, in other embodiments the Elasticsearch report module 428 may search a cluster located on a different database. For example, the Elasticsearch report module 428 may have a list of one or more clusters to search for data based on queries from the search query builder module 424. The request query may use an API call to the database 402 (or other suitable database cluster). In other embodiments, search engines other than Elasticsearch may be used.

At line 536, the Elasticsearch report module 428 generates a search report. The search report may include data from the database 402 (or other database cluster) responsive to the search query from the user (e.g., as built by the search query builder module 424).

The Elasticsearch report module 428 transmits the search report to the consumer application module 410, at line 540. The search report may take any suitable form, such as a list of requested data, a table of requested data, a single requested data item, etc. The consumer application module 410 then displays the search report at line 544, such as on a display of the web UI 412.

In various implementations, the search result may have a data structure that includes a header and a body, where the header includes, for example, a transaction identifier (e.g., a same ID received during the request in order to match with the original requesting web user interface and consumer application), a response time, a response server, a response code, and a code description. The response body may include the query output from the database cluster.

Figure 6:
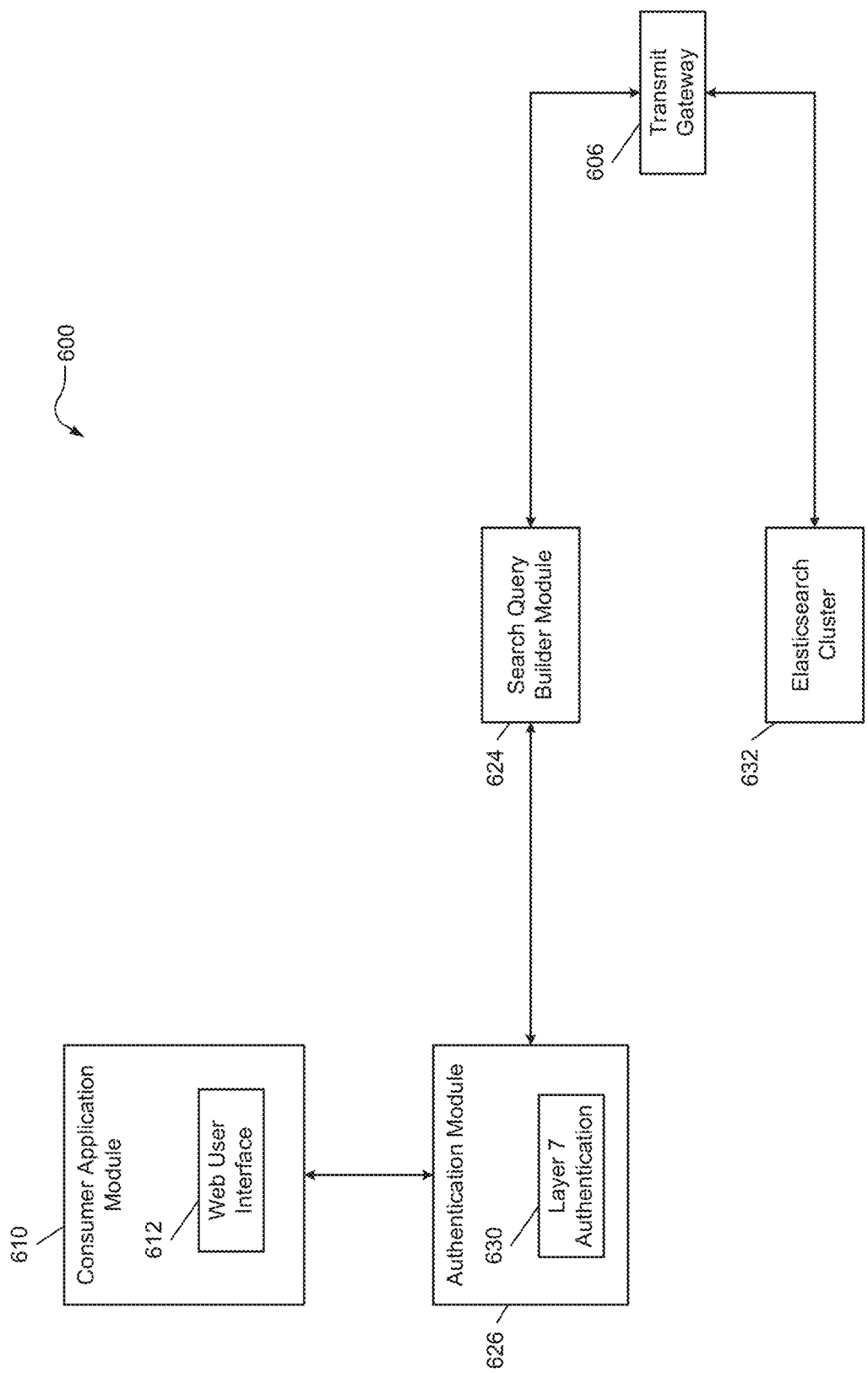
FIG. 6 is a functional block diagram of another example system for automated dynamic database search queries.

FIG. 6 is a functional block diagram of another example system 600 for automated dynamic database search queries. The system 600 includes a consumer application module 610, which has a web user interface 612. The web user interface 612 is configured to receive input from a user, to facilitate a search request. For example, the consumer application module 610 may include a URL request module that converts text entry fields of the web user interface 612 into parameters for a search query.

As a search example, a user may search for claim eligibility for a member. The search input value may be in the form of a key value pair. For example, "MemberId": ["35846182"], "CustomerTransactionId": "123456", "ServiceName": "TI52369".

The system 600 includes an authentication module 626. Although FIG. 6 illustrates the authentication module 626 as including layer 7 authentication 630, other embodiments may include any other authentication architectures (or no authentication features). The consumer application module 610 passes the search parameters through the authentication module 626, where the search parameters may be in the form of a URL request and may include a transaction identifier that identifies which user/instance of the web UI 612 made the specific search request.

The system 600 also includes a search query builder module 624. The search query builder module 624 is configured to receive the URL request parameters from the consumer application module 610 (optionally after being authenticated by the authentication module 626), and dynamically build a search request based on the received parameters.

For example, the search query builder module 624 may transmit the generated search query through a transit gateway 606, to an Elasticsearch cluster 632. The search query may be an API call. The Elasticsearch cluster 632 may be any suitable database or data store location, such as an external data provider (EDP) Elasticsearch cluster. After receiving the search results, the search query builder module 624 may return the results of the search to the consumer application module 610.

Figure 7:
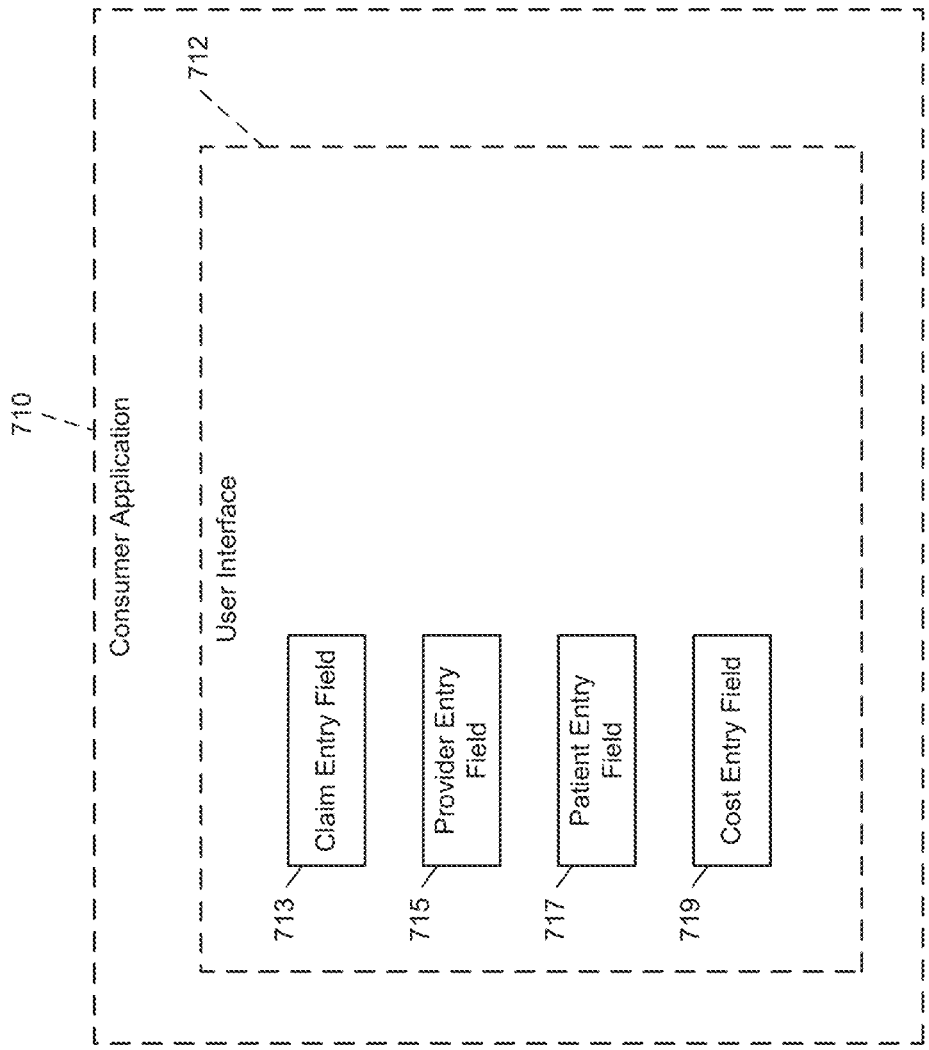
FIG. 7 is a diagram of an example user interface of a consumer application.

FIG. 7 is a diagram of an example user interface 712 of a consumer application 710. The user interface 712 may allow a user to initiate a search query, for example, by entering desired search parameters in one or more fields of the user interface 712.

As shown in FIG. 7, example text entry fields include, but are not limited to, a claim entry field 713, a provider entry field 715, a patient entry field 717, and a cost entry field 719. Other example embodiments may include other example entry fields. The data input by the user may then be converted to multiple parameters of a URL request (or other suitable format for initiating a search query such as an Elasticsearch query).

Processes for Building Dynamic Database Search Queries

Figure 8:
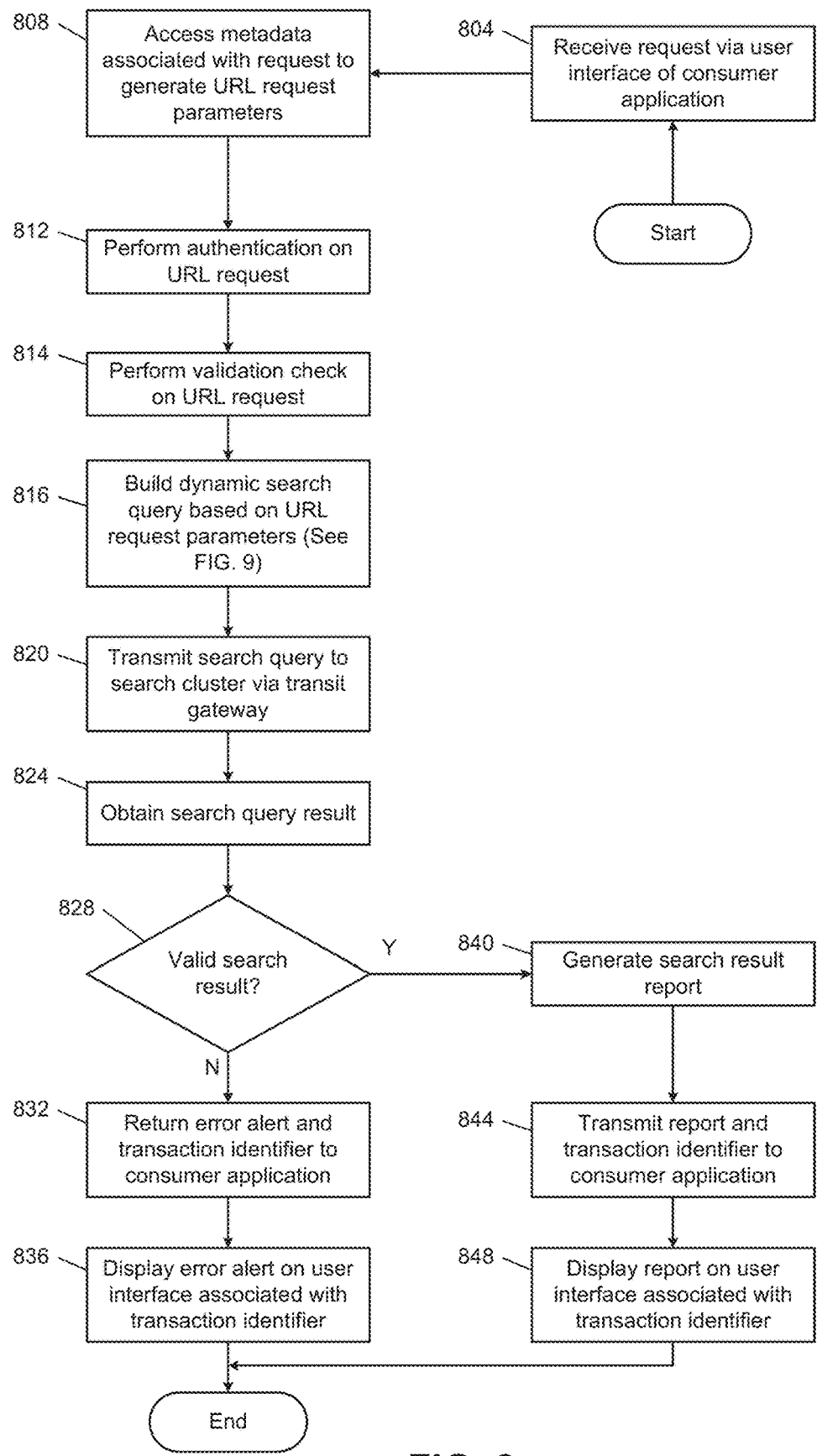
FIG. 8 is a flowchart depicting an example process for automated generation of dynamic database search queries.

FIG. 8 is a flowchart depicting an example process for automated generation of dynamic database search queries. The process of FIG. 8 may be performed by, e.g., one or more components of the system 400 of FIG. 4, such as one or more modules of the system controller 408.

As shown in FIG. 8, the system controller 408 may be configured to start at 804 in response to receiving a request via a user interface of a consumer application, such as the web user interface 412 of the consumer application module 410. At 808, control accesses metadata associated with the request, in order to generate URL request parameters. As an example of accessing metadata, if a request is coming from a claim eligibility UI, then accessed metadata (e.g., a yaml file) may include:

```
Claim-Eligibility-UI
{
    ProjectName:ClaimEligibility
    DatasetName:gov-claim-cxt
    MandatoryAttributes:[MemberId,CustomerTransactionId,
        ReqDateTime,RenderingProviderNPI]
}
```

At 812, the system controller 408 is configured to perform authentication on the URL request. The authentication may be optional, and may include any suitable authentication techniques. One or more validation checks may be performed on the URL request values at 814. For example, business rules or other suitable check algorithms may be used to verify that data in the URL request has a proper format, etc. At 816, control builds a dynamic search query based on the URL request parameters. Details of dynamically building the search query are explained further below with reference to FIG. 9.

The system controller is configured to transmit the search request to a search cluster via a transit gateway (such as the transit gateway 606), at 820. In various implementations, the search cluster may be an Elasticsearch cluster, or other suitable database.

In some example embodiments, a transit gateway may be a router which authenticates a routes a query to the correct database store. For example, in AWS, the system may include an AWS transit gateway which takes a query request, authenticates the query request, and then sends the query request to a specific claim related Elasticsearch cluster.

Control then obtains a search query result at 824 (e.g., control obtains data from the search cluster that is responsive to the search query). At 828, control determines whether the search returned a valid result. For example, some search queries may be declined as having an improper format, may return a NULL result because the requested data of the query does not exist, etc.

If control determines at 828 that the search did not return a valid result, control returns an error alert and transaction identifier to the consumer application, at 832. Control then displays an error alert on the user interface associated with the transaction identifier, at 836.

If control determines at 828 that the search result is valid, control generates a search result report at 840. The system controller 408 is then configured to transmit the report and the transaction identifier to the consumer application at 844. At 848, control displays the report on the user interface associated with the transaction identifier.

Figure 9:
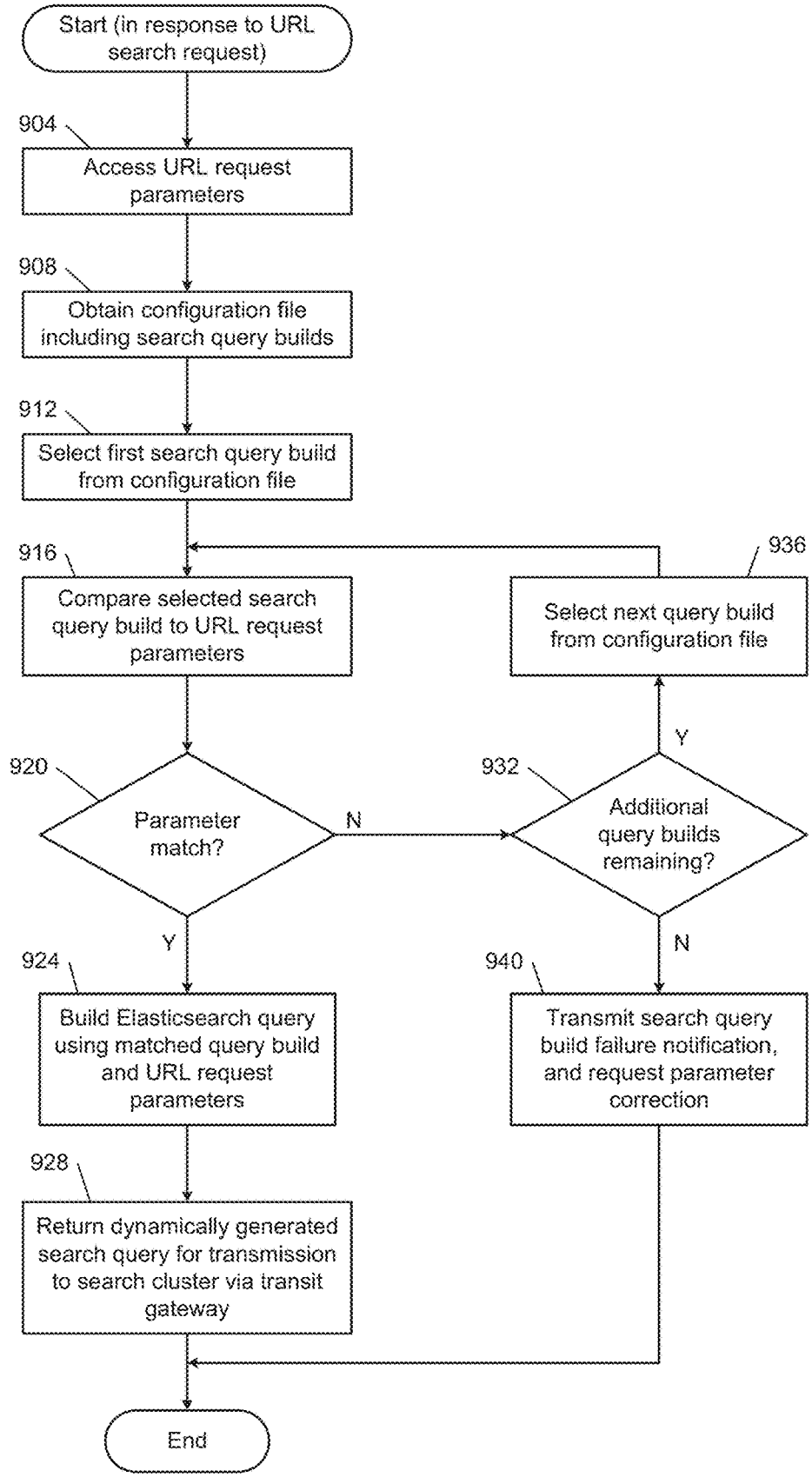
FIG. 9 is a flowchart depicting an example process for dynamically building a search query based on a configuration file.

FIG. 9 is a flowchart depicting an example process for dynamically building a search query based on a configuration file. The process of FIG. 9 starts in response to a URL search request (or any other suitable search request input). At 904, the system controller 408 is configured to access URL request parameters, such as search request parameters input to the web user interface 412 by a user.

At 908, control obtains a configuration file that includes multiple search query builds (e.g., templates for different types of searches). Control selects a first search query build from the configuration file at 912. Control then compares the selected search query build to the URL request parameters at 916.

For example, a first query build in the configuration file may be a search query for patient data. At 916, control may determine whether the URL request parameters match the format of the search query for patient data in the first query build. If the URL request parameters are in a different format, such as a provider data request format, control may check a next search query build.

Referring again to FIG. 9, if control determines at 920 that the URL request parameters do not match the selected query build, control proceeds to 932 to determine whether the configuration file contains any additional search query builds.

If there are no additional search query builds in the configuration file at 932, control transmits a search query build failure notification at 940, and requests parameter correction. For example, control may determine that the URL search request parameters do not match any of the template search query builds in the configuration file, so the user must correct or change at least one of the parameters to see if a matching search query build can be found.

The error notification may include an alert that the search query failed, a system error, an indication that the system could not parse the file due to file naming conventions, etc. In various implementations, a metrics dashboard may display successful search request items and failed search request items, with corresponding reasons for the failures.

If control determines at 932 that there are additional search query builds remaining in the configuration file, control proceeds to 936 to select a next query build from the configuration file. Control then returns to 916 to compare the next selected search query build to the URL request parameters.

Once control identifies a search query build that matches the URL request parameters at 920, control proceeds to 924 to build an elastic search query using the matched query build, and the URL request parameters. Control returns the dynamically generated search query at 928, for transmission to a search cluster via the transit gateway.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements.

The phrase "at least one of A, B, and C" should be construed to mean a logical (A OR B OR C), using a non-exclusive logical OR, and should not be construed to mean "at least one of A, at least one of B, and at least one of C." The term "set" does not necessarily exclude the empty set. The term "non-empty set" may be used to indicate exclusion of the empty set. The term "subset" does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. Such apparatuses and methods may be described as computerized apparatuses and computerized methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for automated entity field correction, the method comprising:
receiving multiple search request parameters at multiple text entry fields of a user interface of an application, the multiple search request parameters corresponding to at least one of a first search query type and a second search query type;
generating uniform resource locator (URL) request parameters according to the received multiple search request parameters;
dynamically building a search query by comparing the URL request parameters to multiple search query templates in a configuration file, the multiple search query templates including at least a first search query corresponding to the first search query type and a second search query corresponding to the second search query type,
wherein comparing the URL request parameters to multiple search query templates in a configuration file includes identifying a matching one of the search query templates in response to a determination that the URL request parameters corresponds to a parameter field of the matching one of the multiple search query templates, and
wherein the configuration file maps a first layout of the multiple text entry fields of the user interface to a first API call format, maps a second layout of the multiple text entry fields of the user interface to a second API call format, and maps a third layout of the multiple text entry fields of the user interface to a third API call format;
transmitting the dynamically built search query to a search cluster of a database using an API call format mapped by the configuration file according to a layout of the multiple text entry fields received at the user interface;
obtaining a search query result from the search cluster; and
displaying the obtained search query result on the user interface of the application.

2. The method of claim 1, wherein:
dynamically building the search query includes building an Elasticsearch query using an Elasticsearch domain specific language (DSL) library; and
the search cluster includes an Elasticsearch database cluster.

3. The method of claim 1, wherein:
the user interface includes a web user interface of a consumer application.

4. The method of claim 1, further comprising:
determining whether the search query result obtained from the search cluster is a valid search result;
displaying the obtained search query result on the user interface of the application in response to a determination that the search query result obtained from the search cluster is a valid search result; and
displaying an error alert on the user interface in response to a determination that the search query result obtained from the search cluster is not a valid search result.

5. The method of claim 1, further comprising:
performing an authentication on a URL request including the generated URL request parameters; and
transmitting the URL request from the application to a dynamic search query builder module in response to successful authentication.

6. The method of claim 5, wherein during the authentication, the application is configured to pass a Layer 7 token in association with an application programming interface (API) request.

7. The method of claim 1, wherein the URL request parameters include at least one of a project name, a dataset name, a member identifier, a customer transaction identifier, a service name, a search request date and time, a rendering provider, a national provider identifier, and a statement date.

8. The method of claim 1, wherein parameter fields of the multiple search query templates include at least one of a project name, a dataset name, a member identifier, a rendering provider, a national provider identifier, a statement from data, a statement to date, a statement truth date, a form type, a service denial value, a column number.

9. The method of claim 1, wherein the search query result includes a header having at least one of a transaction identifier, a response time, a response server, a response code, and a code description.

10. The method of claim 1, wherein the first API call format is configured to query the database to obtain patient information data, the second API call format is configured to query the database to obtain provider information data, and the third API call format is configured to query the database to obtain claims information data.

11. A computer system comprising:
memory hardware configured to store a configuration file and computer-executable instructions, wherein the configuration file includes multiple search query templates; and
processor hardware configured to execute the instructions, wherein the instructions include:
receiving multiple search request parameters at multiple text entry fields of a user interface of an application, the multiple search request parameters corresponding to at least one of a first search query type and a second search query type;
generating uniform resource locator (URL) request parameters according to the received multiple search request parameters;
dynamically building a search query by comparing the URL request parameters to the multiple search query templates in the configuration file, the multiple search query templates including at least a first search query corresponding to the first search query type and a second search query corresponding to the second search query type,
wherein comparing the URL request parameters to multiple search query templates in a configuration file includes identifying a matching one of the search query templates in response to a determination that the URL request parameters corresponds to a parameter field of the matching one of the multiple search query templates, and
wherein the configuration file maps a first layout of the multiple text entry fields of the user interface to a first API call format, maps a second layout of the multiple text entry fields of the user interface to a second API call format, and maps a third layout of the multiple text entry fields of the user interface to a third API call format;
transmitting the dynamically built search query to a search cluster of a database using an API call format mapped by the configuration file according to a layout of the multiple text entry fields received at the user interface;
obtaining a search query result from the search cluster; and
displaying the obtained search query result on the user interface of the application.

12. The computer system of claim 11, wherein:
building dynamically building the search query includes building an Elasticsearch query using an Elasticsearch domain specific language (DSL) library; and
the search cluster includes an Elasticsearch database cluster.

13. The computer system of claim 11, wherein
the user interface includes a web user interface of a consumer application.

14. The computer system of claim 11, wherein the instructions further include:
determining whether the search query result obtained from the search cluster is a valid search result;
displaying the obtained search query result on the user interface of the application in response to a determination that the search query result obtained from the search cluster is a valid search result; and
displaying an error alert on the user interface in response to a determination that the search query result obtained from the search cluster is not a valid search result.

15. The computer system of claim 11, wherein the instructions further include:
- performing an authentication on a URL request including the generated URL request parameters; and
- transmitting the URL request from the application to a dynamic search query builder module in response to successful authentication.

16. The computer system of claim 15, wherein during the authentication, the application is configured to pass a Layer 7 token in association with an application programming interface (API) request.

17. The computer system of claim 11, wherein the URL request parameters include at least one of a project name, a dataset name, a member identifier, a customer transaction identifier, a service name, a search request date and time, a rendering provider, a national provider identifier, and a statement date.

18. The computer system of claim 11, wherein parameter fields of the multiple search query templates include at least one of a project name, a dataset name, a member identifier, a rendering provider, a national provider identifier, a statement from data, a statement to date, a statement truth date, a form type, a service denial value, a column number.

19. The computer system of claim 11, wherein the search query result includes a header having at least one of a transaction identifier, a response time, a response server, a response code, and a code description.

20. The computer system of claim 11, wherein the first API call format is configured to query the database to obtain patient information data, the second API call format is configured to query the database to obtain provider information data, and the third API call format is configured to query the database to obtain claims information data.

* * * * *